United States Patent Office 3,829,513
Patented Aug. 13, 1974

3,829,513
CONVERSION OF GEM-DIFLUORO COMPOUNDS TO FLUOROALKENES AND FLUOROALKAPOLYENES
Lloyd E. Gardner, Bartlesville, Okla., assignor to Phillips Petroleum Company, Bartlesville, Okla.
No Drawing. Application Dec. 30, 1968, Ser. No. 788,000, now Patent No. 3,624,167, which is a division of application Ser. No. 439,475, Mar. 12, 1965, now Patent No. 3,432,441. Divided and this application Oct. 4, 1971, Ser. No. 186,454
Int. Cl. C07c 17/34, 19/08, 21/18
U.S. Cl. 260—653.5        5 Claims

ABSTRACT OF THE DISCLOSURE

Gem difluoro compounds are converted to fluoroalkenes, fluoroalkadienes, or fluoroalkatrienes by contacting said gem-difluoro compounds with a catalyst formed by treating a finely divided alumina with a liquid solution of ammonium fluoride, ammonium bifluoride, or hydrogen fluoride, thereafter draining said solution from said alumina, repeating the treating and draining steps, and thereafter heating the impregnated catalyst to a temperature in the range of 300 to 1000° F. for a period of time in the range of 2 to 24 hours.

---

This is a divisional of copending application Ser. No. 788,000, filed Dec. 30, 1968, now U.S. 3,624,167, which is a division of Ser. No. 439,475, filed Mar. 12, 1965, now U.S. Pat. 3,432,441.

This invention relates to a novel catalyst for the preparation of fluoroalkenes and fluoroalkapolyenes. In another of its aspects, it relates to a process for preparing a catalyst useful for converting acetylenic hydrocarbons to fluoroalkenes, fluoroalkadienes and fluoroalkatrienes. More specifically, the process comprises repeatedly contacting an alumina catalyst with a solution of a fluorine-containing compound. In a still further aspect, the invention relates to a process for regenerating a spent catalyst useful for the production of fluoroalkenes, fluoroalkadienes and fluoroalkatrienes. In a still further aspect, the invention relates to a process for producing fluoroalkenes, fluoroalkadienes and fluoroalkatrienes from acetylenic hydrocarbons. In another of its aspects, the invention relates to the production of flouroalkenes and fluoroalkapolyenes from gem-difluoro compounds by passing the gem-difluoro compounds over a fluoride-impregnated alumina catalyst prepared according to the invention.

Fluoroethylene is a desirable monomer for the preparation of polyvinyl fluoride. Fluorided alumina and aluminum fluoride-alumina mixtures are known for their promotion of the addition of hydrogen fluoride to acetylene in the production of fluoroethylene. However, at the required temperatures for the addition the alumina reacts with hydrogen fluoride until an equilibrium fluorine content in the catalyts is obtained. The reaction is exothermic and induces sintering of the catalyst particles, thereby reducing surface area and reducing catalyst activity. In addition, the above catalysts apparently are non-selective, promoting the addition of a second mole of hydrogen fluoride to produce nearly equal molar quantities of fluoroethylene and 1,1-difluoroethane. Thus, it has become apparent that the method of incorporating fluorine into an alumina, or alumina-containing, catalyst is an important aspect of the preparation of fluoroethylene. I have found that a suitable catalyst for preparing fluoroethylene from acetylene can be prepared by repeatedly treating an alumina or alumina-containing actalyst with a solution of a fluorine-containing compound.

It is therefore an object of this invention to produce a catalyst for conversion of acetylenic hydrocarbons to fluoroalkenes, fluoroalkadienes and fluoroalkatrienes.

It is a further object of this invention to provide a process for making a catalyst suitable for conversion of acetylenic hydrocarbons to fluoroalkenes, fluoroalkadienes and fluoroalkatrienes.

It is a further object of this invention to provide a process for regenerating a catalyst produced by this invention.

It is a still further object of this invention to provide a process for producing a fluoroalkene, a fluoroalkadiene or a fluoroalkatriene from an acetylenic hydrocarbon.

It is a still further object of this invention to provide a process for converting gem-difluoro compounds to fluoroalkenes and fluoroalkapolyenes.

Other aspects, objects and the several advantages of this invention are apparent to one skilled in the art from a study of this disclosure and the appended claims.

In accordance with my invention, an improved catalyst of higher, more stable activity and selectivity for the production of fluoroalkenes and fluoroalkapolyenes by the vapor-phase hydrofluorination of acetylenic hydrocarbons is obtained by repeated impregnation of eta- or gamma-alumina or bauxite with a liquid solution of ammonium fluoride, ammonium bifluoride, or hydrogen fluoride. Water is the solvent of choice for preparing each of these solutions. However, other solvents capable of maintaining a sufficient concentration of the fluoride in solution can be used for the ammonium fluoride and ammonium bifluoride. Examples of such solvents are alcohols and hydroxy-substituted amines. The solvent is evaporated from the catalyst after each impregnation; and after the final impregnation, the catalyst is subjected to a temperature of about 300 to 1000° F., preferably about 600 to 1000° F., usually for about 2 to 24 hours. The number of impregnations required varies, depending on the pore volume of the catalyst and the concentration of fluoride in the solution, but will usually be in the range of 3 to 10, preferably 5 to 10. The preferred concentration of ammonium fluoride or ammonium bifluoride in the impregnating solution is 10 to 50 g./100 ml. of solution; when aqueous solutions of hydrogen fluoride are used, the preferred concentration of the acid is 1 to 20 weight percent. Preferably, the impregnations are repeated a sufficient number of times to give a catalyst which, after the final heat treatment at about 300 to 1000° F., contains 30 to 60 weight percent fluorine. Although the impregnations are conveniently carried out at room temperature, any temperature at which the fluoride remains in liquid solution can be used. In some instances it is desirable to complete the fluoridation of a partially fluorided catalyst by treatment with gaseous hydrogen fluoride, in the presence or absence of an inert diluent such as nitrogen, helium, argon, or the like, prior to use of the catalyst in the production of fluoroalkenes or fluoroalkapolyenes. This vapor-phase fluoridation can be carried out at a temperature of about 300 to 1000° F., preferably about 600 to 800° F.

Further, according to the invention, gem-difluoro compounds, unavoidably produced during the production of fluoroalkenes and fluoroalkapolyenes, can be converted to fluoroalkenes and fluoroalkapolyenes by passing the difluoro compounds over the catalyst of the invention.

The acetylenic hydrocarbons which are preferred for use in the hydrofluorination reaction which employs the catalyst of the invention have the formula R—C≡C—R, where R is selected from the group consisting of hydrogen and alkyl and alkenyl radicals containing not more than 8 carbon atoms, the total number of carbon atoms in the acetylenic hydrocarbons not exceeding 10. Some examples of these preferred acetylenic hydrocarbons are acetylene, propyne, 1-butyne, 2-butyne, 2-pentyne, 1-hexyne, 3-octyne, 2-decyne, 3-methyl-1-pentyne, 2,5-dimethyl-3-hexyne, 1-penten-4-yne, 1-hexen-5-yne, 2-hepten-5-yne, 3-ethyl-1-octen-6-yne, and 1,8-nonadien-4-yne. The acetylenic hydrocarbons containing no unsaturation other than the carbon-to-carbon triple bond are more preferred than those containing alkenyl groups, which tend to make the hydrocarbon more susceptible to undersired side reactions. Although it is preferable to use acetylenic hydrocarbons containing not more than 10 carbon atoms, this preference is not a critical limitation. In the hydrofluorination of these acetylenic hydrocarbons containing not more than 10 carbon atoms, this preference is not a critical limitation. In the hydrofluorination of these acetylenic hydrocarbons, the elements of hydrogen fluoride add to the triply bonded carbon atoms in accordance with the Markownikoff rule to give a fluoroalkene or fluoroalkapolyene. The fluorine atom is attached to one of the carbon atoms adjacent the newly formed double bond. Gem-difluoro compounds are produced as minor products through the addition of the elements of two molecules of hydrogen fluoride to the triply bonded carbon atoms.

The mole ratio of hydrogen fluoride to acetylenic hydrocarbon should be in the range of 0.2:1 to 20:1, preferably 1:1 to 2:1. Lower ratios result in lower conversion of the acetylenic hydrocarbons, and higher ratios give larger amounts of the gem-difluoro compound. The flow rate of the reaction mixture should be 50–5000, preferably 200–1000 volumes (standard conditions) per volume of catalyst per hour. The temperature in the reaction zone should be 500–750° F., preferably 600–700° F. Although the pressure is conveniently maintained at substantially atmospheric, values somewhat above or below this level, such as up to about 50 p.s.i.g., can be employed when desired.

Further, according to the invention, there is provided a process for regenerating a spent catalyst used in the process of this invention. After continued use of the catalyst it becomes coated with carbonaceous material and it loses its effectiveness. The catalyst can be regenerated by passing air in the range of 700–950° F., preferably at about 800° F. through the catalyst bed at a volume low enough to prevent the hot zone temperature of the bed from rising above 950° F. A chamber is then flushed with nitrogen and the catalyst temperature is lowered to a temperature in the range of 600–675° F. Hydrogen fluoride vapor is then passed over the catalyst at a temperature of approximately 600–675° F. to replace the lost fluorine.

EXAMPLE I

The catalyst was prepared by impregnation of 136.4 g. of eta-alumina (Davison Chemical Corp.), in the form of ⅛-in. pills, with an aqueous solution containing 18 g. of ammonium bifluoride per 100 ml. of solution. The impregnation was carried out six times, the treated alumina being drained and dried at about 120° C. following each impregnation. In addition, between each draining and drying operation the pills were washed with acetone to improve dispersion of solution on the catalyst surface. The volume of ammonium bifluoride solution absorbed in each impregnation was as follows:

| Impregnation: | Volume absorbed, ml. |
|---|---|
| 1 | 90 |
| 2 | 105 |
| 3 | 84 |
| 4 | 79 |
| 5 | 70 |
| 6 | 52 |

After the final impregnation and drying the catalyst was heated to 1000° F. in a muffle furnace and maintained at this temperature for six hours. The resulting catalyst, which contained 36.2 percent fluorine, was then compared with two related catalysts for utility in the production of fluoroethylene from acetylene and hydrogen fluoride by the process described below.

A vertical 1-in. x 32-in. monel tube with a concentrically mounted thermowell (⅜₆-in. o.d.) was packed with about 17 in. of a catalyst, about 7 in. of supporting material being present below the catalyst. The space above the catalyst served as a preheat zone. The desired reactor temperature was maintained by the use of a furnace equipped with three electric heaters which were electronically controlled. Hydrogen fluoride was charged to the system in vapor form through a Kel F flow meter, from a vessel maintained at 38° C. by use of a temperature-controlled oil bath. Acetylene was charged from a cylinder through a second flow meter. Initially the system was flushed out with dry nitrogen, after which hydrogen fluoride, in the absence of acetylene, was passed over the catalyst. Nitrogen was employed as a diluent in the hydrogen fluoride during the vapor phase fluoridation of catalyst 3. When the desired constant temperature and hydrogen fluoride flow rate were obtained, the flow of acetylene was begun. The two reactants were not mixed until they reached the preheat zone in the top part of the reactor. The reactor effluent, consisting of hydrogen fluoride, acetylene, fluoroethylene, and 1,1-difluoroethane, was passed through a water-cooled condenser. The effluent was then passed through two scrubbing towers containing sodium hydroxide to remove unreacted hydrogen fluoride; moisture was then removed with Drierite. The dry gas free of hydrogen fluoride was collected and measured in a product trap cooled to —80° C., or passed directly to a meter for measurement. Sampling valves were conveniently located for gas chromatographic analysis of the dry, hydrogen fluoride-free gas.

As the performance of these catalysts is known to remain essentially contant during the first 12 hours of use, each of the hydrofluorination experiments was carried out over a 3- to 6-hours period falling within the first 12 hours of catalyst use. The conversion of acetylene and the mole ratio of fluoroethylene to 1,1-difluoroethane in the product are based on average values obtained in gas chromatographic analyses made hourly during the 3- to 6-hour experiments.

The results obtained in the hydrofluorination experiments employing each of three different catalysts are summarized in Table 1. The data in Table 1 show that catalyst 1, prepared by the multiple impregnation technique of this invention, was more selective in effecting the production of fluoroethylene instead of 1,1-difluoroethane, at the same time exhibiting a high degree of activity as shown by the high conversion of acetylene. In addition, the activity and selectivity of catalyst 1 remained more stable than did that of the other two catalysts. Table 1 also shows that the use of catalyst 1 which had received 6 impregnations with aqueous ammonium bifluoride, the conversion of acetylene was only slightly less and the ratio of fluoroethylene to 1,1-difluoroethane was much greater than with the use of catalyst 3, which had received no impregnations.

TABLE 1

| Catalyst | Reaction temp., °F. | Flow rate, v./v./hr. | $HF/C_2H_2$ mole ratio | $C_2H_2$ conv., percent | $CH_2=CHF/CH_3CHF_2$ mole ratio in product |
|---|---|---|---|---|---|
| 1 [a] | 675 | 308 | 3.0 | 94 | 3.5 |
| 2 [b] | 670 | 292 | 3.5 | 30 | 2.6 |
| 3 [c] | 675 | 280 | 4.0 | 98 | 1.1 |

[a] Catalyst 1 was prepared by the multiple impregnation method of this invention, as described above.
[b] Catalyst 2 was prepared by breaking ¼-in. $AlF_3$ commercial pills (Harshaw Chemical Co.) to a size of 10–20 mesh; these pills contained 58.3 percent fluorine by weight.
[c] Catalyst 3 was prepared by vapor phase fluoridation of eta-alumina with hydrogen fluoride diluted with nitrogen; the resulting catalyst contained 55.0 percent fluorine by weight.

The following is a specific example of a regeneration of a spent catalyst of the invention.

EXAMPLE II

After catalyst 1 had been used for 50 hours in the hydrofluorination of acetylene, it was reactivated by passing dry air through the reactor containing the catalyst at an initial temperature of 800° F. The flow rate of the air was controlled at about 150 volumes per volume of catalyst per hour so as to prevent the temperature of the hot zone which moved through the catalyst bed from exceeding 950° F., thereby avoiding sintering of the catalyst. Determination of the carbon oxides produced during the combustion showed the carbon content of the catalyst prior to reactivation to have been 10.0 weight percent. Fluorine loss during the combustion was 2.5 weight percent of the fluorine initially present; this loss was determined by absorption of the evolved hydrogen fluoride in water, and subsequent titration with standard base. After the combustion was completed, the catalyst chamber was flushed with nitrogen, and the catalyst temperature was lowered to 600–675° F. Hydrogen fluoride vapor was then passed over the catalyst at 600–675° F. for about 1 hour to replace the fluorine lost during the combustion.

To demonstrate the effectiveness of the reactivated catalyst, results obtained in the hydrofluorination of acetylene during 6-hour experiments immediately preceding and immediately following the reactivation were compared. In each of these experiments hydrogen fluoride and acetylene in an $HF/C_2H_2$ mole ratio of 1.4 were passed, at atmospheric pressure and at a total flow rate of 400 volumes per volume of catalyst per hour, over the catalyst maintained at a temperature of 675° F. The table below shows the acetylene conversion, mole ratio of fluoroethylene to 1,1-difluoroethane in the product, and per pass yield of fluoroethylene obtained in each of the 6-hour experiments. From the table it can be seen that reactivation rendered the catalyst decidedly improved with respect to acetylene conversion and fluoroethylene yield. Although the reactivated catalyst gave a lower ratio of fluoroethylene to 1,1-difluoroethane, other experiments have shown that this ratio increases with continued use of the catalyst following reactivation.

TABLE 2

Before catalyst reactivation:
$C_2H_2$ conv. percent _____ 43
$CH_2=CHF/CH_3CHF_2$ mole ratio in product __ 8.5
Per pass yield, g. $CH_2=CHF$ per g. $C_2H_2$ charged _____ 0.4

After catalyst reactivation:
$C_2H_2$ conv. percent _____ 84
$CH_2=CHF/CH_3CHF_2$ mole ratio in product __ 5.0
Per pass yield, g. $CH_2=CHF$ per g. $C_2H_2$ charged _____ 1.3

It is to be understood that although the invention is described for the most part with regard to the production of fluoroalkenes, it is obvious that fluoroalkapolyenes can also be produced by the invention. Thus, the invention is not necessarily to be limited to the production of fluoroalkenes but it can also include the production of fluoroalkadienes, fluoroalkatrienes, and the like. Examples of such fluoroalkenes and fluoroalkapolyenes produced according to the invention include fluoroethylene, 2-fluoropropene, 2-fluoro-1-butene, 2-fluoro-2-butene, 2-fluoro-1-hexene, 4-fluoro-3-octene, 2-fluoro-1-decene, 3-methyl-2-fluoro-1-pentene, 2,5-dimethyl-3-fluoro-3-hexene, 2-fluoro-1,4-pentadiene, 2-fluoro-1,5-hexadiene, 3-fluoro-2,5-hepadiene, 3-ethyl-6-fluoro-1,6-octadiene, and 4-fluoro-1,4,8-nonatriene.

The gem-difluoro compounds, such as gem-difluoroalkanes, gem-difluoroalkenes, and gem-difluoroalkadienes, which are unavoidably produced in the production of the fluoroalkenes and fluoroalkapolyenes according to the invention, can be converted to the desired fluoroalkenes and fluoroalkapolyenes by recycling the gem-difluoro compounds over the catalyst of this invention. The gem-difluoro compounds are produced as a minor product through the addition of the elements of two molecules of hydrogen fluoride to the triply bonded carbon atoms.

The catalyst prepared according to the invention can be used for the dehydrofluorination of gem-difluoro compounds. In such a process, the gem-difluoro compounds can be passed over the fluoride-impregnated catalyst at flow rates of 10 to 1000, and preferably 50 to 200, volumes (standard conditions) per volume of catalyst per hour, and a reaction temperature of 500° F. to 900° F., generally in the range of 675° F. to 725° F. The pressure is substantially atmospheric, although higher or lower pressures can be employed, as desired. The reaction can take place with or without the presence of an acetylenic compound.

The alumina used to prepare the catalyst is of a high porous, high surface area type. Preferably, the alumina is eta- or gamma-alumina; less preferably, the alumina may be bauxite. The alumina can be used alone for the catalyst formation or it can be combined with a metal-containing constituent. This constituent is a fluoride of zinc, chromium, cobalt, silver, copper, vanadium, iron, or nickel, or a salt, oxide, or other form convertible to a fluoride by the subsequent high temperature reaction with hydrogen fluoride. The metal-containing constituent can be incorporated in the alumina in any convenient manner. For example, the metal compound can be ground with the alumina and the resulting composite then pelleted. Alternately, the alumina can be impregnated with a solution containing the metal.

The catalyst of the invention can be used to aid in the separation of acetylenic hydrocarbons from other hydrocarbons of similar boiling point or molecular weight. As an example, acetylene can be removed from streams containing ethylene and/or ethane; propyne can be separated from propylene and/or propane; and butyne can be separated from butenes and/or butanes. In such a process, the acetylenic hydrocarbons would be converted to fluoroalkenes which could then be easily separated by a physical process such as fractionation, from the other unreacted hydrocarbons.

Reasonable variation and modification are possible within the scope of the foregoing disclosure and the appended claims to the invention, the essence of which is that a catalyst suitable for producing fluoroalkenes, fluoroalkadienes and fluoroalkatrienes from acetylenic hydrocarbons can be prepared by repeated impregnation of at least one of a gamma-alumina, eta-alumina, or bauxite catalyst with a solution of a fluorine-containing compound, followed by heating of said catalyst after each impregnation step; and a spent fluorine-containing alumina catalyst suitable for production of fluoroalkenes, fluoroalkadienes and fluoroalkatrienes can be regenerated by heating said catalyst to a temperature in the range of 700 to 950° F., cooling said catalyst to a temperature in the range of 600 to 675° F., and contacting said catalyst with a hydrogen fluoride gas; and that gem-difluoro compounds are converted to fluoroalkenes and fluoralkapolyenes by passing the gem-difluoro compounds over a fluoride-containing alumina catalyst.

I claim:

1. A process for converting gem-difluoro compounds selected from the group consisting of gem-difluoralkanes, gem-difluoroalkenes, and gem-difluoroalkadienes, to fluoroalkenes, fluoroalkadienes, and fluoroalkatrienes comprising contacting, at a temperature of 500° F. to 900° F., said gem-difluoro compounds with a catalyst formed by treating a finely divided alumina catalyst comprising at least one of gamma-alumina, eta-alumina, and bauxite with a 1–20 weight percent liquid solution of at least one of $NH_4F$, $NH_4F \cdot HF$, and HF, draining said solution from said alumina, repeating said treating and draining steps, and thereafter heating said impregnated catalyst to a temperature in the range of 300 to 1000° F. for a period of time in the range of 2 to 24 hours to provide a catalyst containing 30–60 weight percent fluorine.

2. A process according to claim 1 wherein said catalyst is heated to a temperature of about 120° C. after each draining step; and wherein said impregnated catalyst is heated to a temperature of about 1000° F. for a time of about 6 hours.

3. A process according to claim 1 wherein said catalyst is contacted after impregnation with HF vapors at a temperature between 300 and 1000° F.

4. A process according to claim 1 wherein said solution is a solution of ammonium bifluoride, said gem-difluoro compounds being passed over said catalyst at a flow rate of 10 to 1000 volumes per volume of catalyst per hour.

5. A method according to claim 1 wherein said gem-difluoro compounds are gem-difluoroalkanes and said gem-difluoro compounds are converted to fluoroalkenes.

References Cited
UNITED STATES PATENTS

| | | | |
|---|---|---|---|
| 3,456,025 | 7/1969 | Gardner | 260—653.5 |
| 2,478,032 | 8/1949 | Miller et al. | 260—653.5 |

DANIEL D. HORWITZ, Primary Examiner

U.S. Cl. X.R.

252—416; 260—653.4